A. E. FRY.
CLAMP FOR CYLINDER OUTLET HOSE.
APPLICATION FILED NOV. 5, 1921.

1,409,696.

Patented Mar. 14, 1922.

Inventor
Arthur E. Fry
By Watson E. Coleman
Attorney

UNITED STATES PATENT OFFICE.

ARTHUR E. FRY, OF COVEDALE, KENTUCKY.

CLAMP FOR CYLINDER-OUTLET HOSE.

1,409,696. Specification of Letters Patent. Patented Mar. 14, 1922.

Application filed November 5, 1921. Serial No. 513,034.

*To all whom it may concern:*

Be it known that I, ARTHUR E. FRY, a citizen of the United States, residing at Covedale, in the county of Lewis and State of Kentucky, have invented certain new and useful Improvements in Clamps for Cylinder-Outlet Hose, of which the following is a specification, reference being had to the accompanying drawings.

Heretofore the clamps on the cylinder outlet hose of automobiles, simply engage about the hose, to hold it in place. The clamps in this construction are simply in the form of bands with out-turned ends, and when drawn in clamping engagement, the hose tends to more or less bulge at points between the ends of the clamps, and in time there is a tendency for the hose to leak at points where it bulges.

It is the purpose of the present invention to provide a clamp constructed of suitable spring sheet metal of sufficient length, whereby it may clamp about cylinder outlet hose of different diameters, and hold the hose, so that it will not bulge between the bands, which surround the clamp.

The cylinder outlet hose connects the radiator inlet connection and the forward upper end of the cylinder head for the purpose of conducting the cooling fluid, such as water, from the water jacket of the cylinder to and through the radiator. Therefore another purpose is to provide an adjustable clamp and the surrounding band, for connecting cylinder outlet hose of different diameters, the clamp proper being of sufficient length to cover the entire cylinder outlet hose from the radiator inlet connection to the cylinder head, and in this way protecting the cylinder outlet hose from the weather and the moisture, which more or less tends to decay the hose.

While the design and construction at present illustrated and set forth are deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, that will be hereinafter set forth, shown in the drawings and claimed.

In the drawings:—

Figure 1:
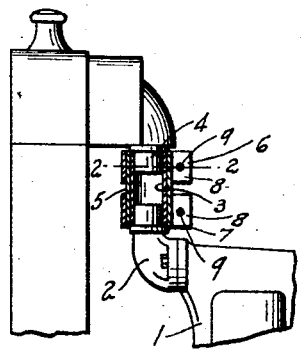
Figure 1 is a view in elevation of a portion of the radiator, namely the radiator inlet connection and a portion of the cylinder head, showing the cylinder outlet hose as applied, with the clamp and the surrounding bands in position.
Figure 2:
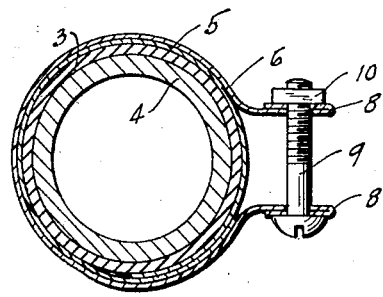
Figure 2 is a sectional view on line 2—2 of Figure 1, more clearly showing the construction of the clamp and one of the bands.
Figure 3:
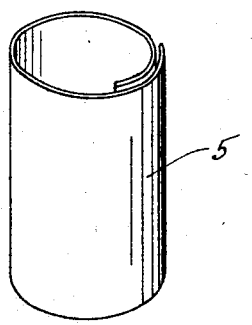
Figure 3 is an enlarged detail view of the clamp, which surrounds the cylinder outlet hose.

Referring to the drawings, 1 designates the forward portion of a cylinder head of an automobile engine preferably the Ford automobile, and to the outlet end 2 of the water jacket of the cylinder, a cylinder outlet hose 3 is connected. This cylinder outlet hose 3 is in turn engaged with the radiator inlet connection 4.

Surrounding the cylinder outlet hose, for a distance from the radiator inlet connection to the outlet connection of the water jacket for the cylinder head, so as to entirely cover the hose is a clamp 5. This clamp 5 is constructed of spring sheet metal, and is designed to be made of sufficient length, so as to clamp about cylinder outlet hose of different diameters, and to clamp the hose securely upon the radiator inlet connection and the cylinder head outlet connection. In fact the clamp covers the entire cylinder outlet hose, and bears the same against the radiator inlet connection and the cylinder head outlet connection, thereby entirely protecting the cylinder outlet hose from the dampness and the weather. The clamp 5 is also of sufficient length so that its ends may overlap, to permit the clamp to accommodate itself to hose of different diameters, and to thoroughly cover the hose. In order to draw the clamp tight about the radiator inlet connection and the cylinder head outlet connection spring clamping bands 6 and 7 are engaged about the upper and lower ends of the clamp. These bands may be made any width, and in the present instance are designed to be relatively wide, so as to insure a thorough clamping action of the clamp on the hose. The bands have lateral ears 8, through which screw bolts 9 engage, there being nuts 10 upon the bolts, to draw the bands tightly in place and securely about the clamps. It will be noted that the bands are made in such proportions as to provide substantial spaces between the lateral ears, thereby making ample provision for drawing the bands about the clamps, which fit hose of different diameters. The relatively wide spaces between the lateral ears may exist in this instance, due to the fact that the clamp completely covers the cylinder outlet hose at points where the ears laterally project.

Figure 4:
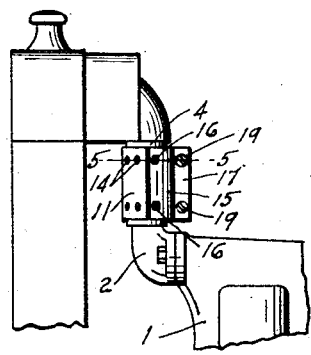
Figure 4 is a view in side elevation of a portion of the radiator inlet connection and a portion of the cylinder head showing a modified construction of clamp as applied to the cylinder outlet hose connection.
Figure 6:
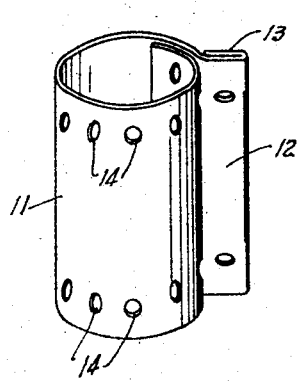
Figure 6 is a detail view of a clamp which surrounds the cylinder outlet hose, showing the detachable adjustable jaw removed.
Figure 5:
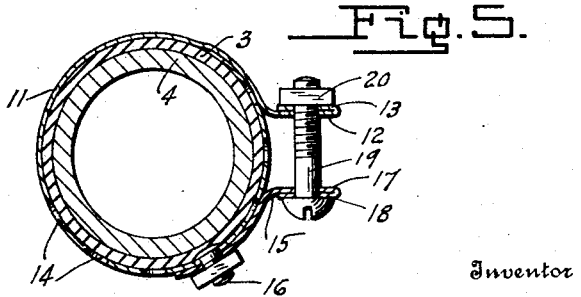
Figure 5 is a sectional view on line 5—5 of Figure 4.

In Figures 4, 5 and 6 the bands are dispensed with. However the clamp in Figures 4, 5 and 6 is made of sufficient length to fit cylinder outlet hose of different diameters, also to overlap, to insure this advantage. One end of the clamp 11 terminates in a lateral jaw or flange 12, which is bent upon itself as shown at 13, to reinforce the flange or jaw. The clamp adjacent its edges is provided with a plurality of apertures or openings 14, which are arranged toward and adjacent the other end of the clamp.

A plate 15 is arranged adjacent the outer face of the clamp, there being bolts 16 passing through the apertures or openings and through the plate 15, to secure the same adjustably on the clamp. The plate 15 is provided with a lateral jaw or flange 17, which is bent upon itself as at 18 to reinforce the jaw or flange. Suitable screw bolts 19 pass through the two jaws or flanges, and are provided with nuts 20. Obviously by turning the nuts 20 home, drawing the screw bolts through the flanges or jaws, the clamp may be drawn securely and tightly about the cylinder outlet hose. In this construction the ends of the clamp also overlap, and due to the provision of the apertures or openings in the adjustability of the plate 15, the clamp may be made to fit cylinder outlet hose of different diameters. Furthermore due to the overlapping of the ends of the clamp, in this construction, prevents the cylinder outlet hose from bulging between the jaws or flanges, and also completely protects the hose from the weather conditions.

The invention having been set forth, what is claimed is:

1. In a device for the purpose indicated, the combination with a cylinder head outlet connection and a radiator inlet connection, of a cylinder outlet hose adjoining said connections, a clamp entirely surrounding said cylinder outlet hose and provided with overlapping ends, the construction and arrangement of said clamp being such as to cover the entire cylinder outlet hose, and to draw the cylinder outlet hose tight against said connections, and means for drawing the clamp securely and tightly about the connections, said means comprising relatively wide bands engaged about the ends of the clamp, to draw the overlapping ends thereof securely in position, said bands having lateral ears, and screw bolts passing through the ears and provided with means to draw the ears together and tighten the bands.

2. In a device for the purpose indicated, the combination with a cylinder head outlet nipple and a radiator inlet nipple, said outlet and inlet nipples having shoulders, of a cylinder inlet hose adjoining said nipples, whereby its opposite ends may contact with said shoulders, a clamp entirely surrounding said cylinder outlet hose and provided with overlapping ends, the construction and arrangement of said clamp being such as to cover the entire cylinder outlet hose and draw it tight against said nipples, and bands engaging about the ends of the clamp, said bands being of substantial width at least greater than the length of the nipples, in order to extend therebeyond, so as to clamp tightly against the ends of the clamp and draw the same against the hose, said bands overlying the lapping ends of the clamp to insure holding the clamp and hose tightly in place, said bands having lateral ears, and screw bolts passing through the lateral ears and provided with means to draw the ears together and tighten the bands.

In testimony whereof I hereunto affix my signature.

ARTHUR E. FRY.